United States Patent Office 3,658,880
Patented Apr. 25, 1972

3,658,880
4b,5,6,7,9,10 - HEXAHYDRO - 4-HYDROXY-2,4b-DI-METHYL - 7 - OXO - 1 - PHENANTHRENEPRO-PIONIC ACID
Norman A. Nelson, Galesburg, Mich., assignor to The Upjohn Company, Kalamazoo, Mich.
No Drawing. Filed July 28, 1969, Ser. No. 845,533
Int. Cl. C07c 65/20, 69/76
U.S. Cl. 260—468.5
6 Claims

ABSTRACT OF THE DISCLOSURE

This invention relates to novel 4-hydroxy-7-oxohexahydrophenanthrene derivatives of steroids, represented by the following formula and to processes for their preparation:

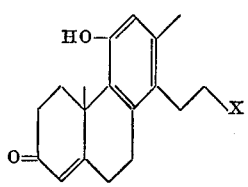

II wherein X is —COOR, in which R is hydrogen or lower-alkyl;

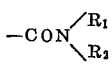

in which $R_1$ and $R_2$ taken separately are each hydrogen or lower-alkyl, and $R_1$ and $R_2$ taken together with the nitrogen constitute a cyclic amino radical containing from 2 to 6 carbon atoms in the heterocyclic ring; —NHCOOR$_3$ in which $R_3$ is lower-alkyl; —NHCOR$_3$, in which $R_3$ is lower-alkyl; —NHSO$_2$R$_4$, in which $R_4$ is lower-alkyl or aryl; and the pharmacologically acceptable salts of the compounds wherein X is —COOR, in which R is hydrogen. The compounds of the above structural Formula (II) are anti-inflammatory and antimicrobial agents.

SUMMARY OF THE INVENTION

The novel compounds of Formula II of this invention and the processes for their preparation are illustratively represented by the following sequences of formulae:
Sequence A:

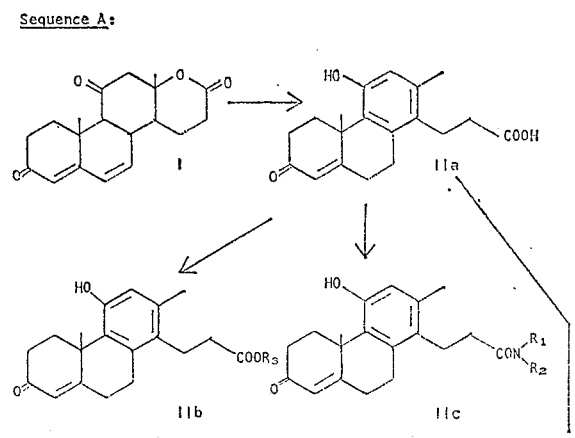

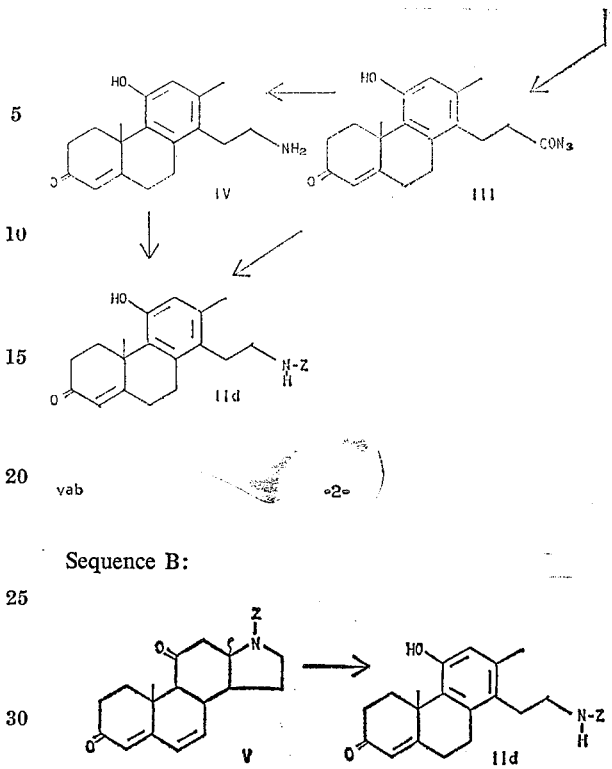

Sequence B:

wherein $R_1$, $R_2$ and $R_3$ have the meanings given above and Z is —COOR$_3$; —COR$_3$ or —SO$_2$R$_4$, in which $R_3$ and $R_4$ have the meanings given above.

In this application, the term "lower-alkyl" means an alkyle radical of 1 to 6 carbon atoms, inclusive, such as methyl, ethyl, propyl, butyl, amyl, hexyl and isomeric forms thereof. The term "aryl" means an aryl radical of 6 to 12 carbon atoms, inclusive, such as phenyl, tolyl, xylyl, naphthyl, diphenyl, halophenyl, nitrophenyl and the like. The term cyclic amino radical means a saturated 3 to 7 ring atom cyclic amino radical and is inclusive of ethyleneimino, trimethyleneimino, pyrrolidino, piperidino and the like. The term "pharmacologically acceptable salts" means salts of the free acids of Formula II, wherein X is —COOR in which R is hydrogen. Suitable salts for that purpose can contain the cationic form of a metal, an amine, or can contain a quaternary ammonium ion. Especially preferred metal cations are those derived from the alkali metals, e.g., lithium, sodium and potassium, and from the alkaline earth metals, e.g., magnesium and calcium, although the cationic form of other metals, e.g., aluminum, zinc and iron are within the scope of this invention.

Pharmacologically acceptable amine cations within the scope of this invention can be derived from primary, secondary or tertiary amines. Examples of suitable amines are methylamine, dimethylamine, trimethylamine, ethylamine, dibutylamine, triisopropylamine, N-methylhexylamine, α-phenylethylamine, ethylenediamine, and the like, as well as piperidine, morpholine, pyrrolidine, piperazine, and the like, and lower-alkyl derivatives thereof, amines containing water-solubilizing or hydrophilic groups such as mono-, di- and triethanolamines, ethyldiethanolamine, N-phenylethanolamine, galactamine, N-methylglucamine, and the like.

The wavy lines appearing in the above structural formulae indicate the α (alpha) configuration, the β (beta) configuration and mixtures thereof.

Formula II, above, is a combination of the compounds of formulae IIa, IIb, IIc and IId, which are prepared in accordance with reaction sequences A and B, above. The compounds of Formula II are active anti-inflammatory and antimicrobial agents.

As anti-inflammatory agents the novel compounds of this invention can be used in dosages of 0.5–15 mg./kg. in the treatment of gouty arthritis, rheumatoid arthritis, rheumatoid spondylitis, osteoarthritis, psoriatic arthritis, acute superficial thrombophlebitis and painful shoulder syndromes such as peritendinitis, capsulitis, bursitis, and acute shoulder arthritis as well as contact dermatitis, atopic dermatitis, neurodermatitis, anogenital pruritus, soborrheic dermatitis, and the like, and for the relief of pain and fever. The novel compounds of this invention also find application in the local treatment of inflammatory conditions in animal mastitis, a disease of the mammary glands which can be of particular concern in milk-producing animals such as cows.

The compounds of Formula II of this invention are also useful for promoting recovery from coccidial infections and reducing the severity of cecal lesions.

Suitable solid dosage forms include tablets, pills, capsules, granules, powders, suppositories and the like. Advantageously, the pharmaceutical carriers for such solid forms include cornstarch, lactose, dicalcium phosphate, terra alba (calcium sulfate), talc, stearic acid, magnesium stearate and gums. Suitable fluid dosage forms include solutions, suspensions, syrups and emulsions. Advantageously, the pharmaceutical carrier for such fluid forms comprise water, oils and water-oil emulsions. If desired, suitable dispersing or suspending agents can be included, for example, tragacanth, acacia, aliginates, dextran, sodium carboxymethylcellulose, methylcellulose, polyvinylpyrrolidone, gelatin, and mixtures thereof. Suitable oils for solutions and water-oil emulsions include cottonseed oil, sesame oil, coconut oil and peanut oil.

REACTION SEQUENCE A

The starting material for the process of reaction sequence A of this invention is 6-dehydro-11-ketotestololactone which is prepared by treating 11α-hydroxytestololactone with chloranil and oxidizing the 6-dehydro-11α-hydroxytestololactone thus obtained, with chromic acid to give 6-dehydro-11-ketotestololactone in accordance with Preparations 1 and 2, herein.

In carrying out the process of reaction sequence A of this invention to obtain the compounds of Formula II, 11-ketotestololactone (I) is subjected to ring cleavage under acid such an hydrochloric, sulfuric, acetic and the like, basic conditions followed by acidification with an aqueous to obtain 4b,6,7,9,10-hexahydro-4-hydroxy-2,4b-dimethyl-7-oxo-1-phenanthrenepropionic acid (IIa).

Illustrative of bases which can be used are alkali metal alkoxides, such as potassium t-butoxide, sodium methoxide, lithium ethoxide, and the like; sodium, potassium or lithium hydroxide in alcohols or aqueous alcohols; quaternary ammonium hydroxides, and the like. The reaction is advantageously conducted in an organic solvent such as alcohol, e.g., methanol, ethanol, propanol, isopropanol, butanol and tert.-butanol; tetrahydrofuran, diglyme, dimethylformamide, dioxane or other suitable solvent. The reaction is carried out within a temperature range from about 0° C. to about 50° C., a temperature within the range of about 20° C. to about 35° C. to about room temperature, is convenient and avantageous. If desired when an alkali metal alkoxide is used, the reaction can be carried out in the presence of a cosolvent such as methylene chloride. The carboxylic acid so obtained is recovered from the reaction mixture in accordance with conventional methods, e.g., extraction with a suitable solvent such as methylene chloride, ether, benzene, mixtures thereof and the like.

The carboxylic acid (IIa) is converted to its pharmacologically acceptable salts in accordance with known methods, for example, by reaction with one equivalent of an aqueous metal hydroyide, carbonate or bicarbonate or with an amine as hereintofore described. The salt is recovered and purified by conventional methods, for example, by precipitation from a suitable solvent such as acetone, or by freeze drying.

The carboxylic acid (IIa) is converted to its corresponding alkyl esters (IIb) in accordance with known methods, for example, by reaction with a diazoalkane, for example, with excess ethereal diazomethane in a suitable organic solvent such as tetrahydrofuran, ether, methylene chloride, methanol, mixtures thereof, and the like. When the reaction is complete, the excess diazoalkane is destroyed with acetic acid and the product is isolated and purified by conventional methods, for example, chromatography or by crystallization from a suitable solvent. Alternatively, the carboxylic acid (IIb) can be converted to the corresponding ester (IIb) using standard esterification conditions, for example, using an alkanol such as methanol in the presence of a mineral acid such as sulfuric acid.

The amides of Formula IIc are prepared by treating the carboxylic acid (VI) with an equivalent amount of a trialkyl amine such as triethylamine and an alkyl chloroformate, such as methyl chloroformate, ethyl chloroformate, isobutyl chloroformate, and the like, in an aqueous organic solvent such as acetone to give a mixture of carboxylic-carbonic anhydrides in accordance with the method of J. Weinstock, J. Org. Chem. 26, 3511 (1961). The mixed anhydride so produced is treated with the desired amine, for example, ammonia, methylamine, alkylamine, dimethylamine, dialkylamine, ethyleneimine, trimethyleneimine, pyrrolidine, or piperidine. The product is isolated by conventional means, for example, chromatography and/or crystallization from a suitable solvent.

The compounds of Formula IId are prepared by treating the mixed anhydride intermediate, prepared above, with sodium azide to give the acid azide of Formula III which is heated with aqueous acetic acid to obtain the amine (IV). The amine so obtained is best handled and isolated as a mineral acid salt. The amine (IV) or acid salt thereof in an inert organic solvent such as methylene chloride, tetrahydrofuran, benzene, toluene, chloroform and the like, is treated with an excess of an acid halide or anhydride in the presence of a base such as ammonium hydroxide, sodium hydroxide, pyridine and the like. Acid halides and anhydrides which can be employed are, for example, aryl and alkyl sulfonyl halides of the formula $R_4SO_2X$, wherein $R_4$ is alkyl or aryl as hereinbefore defined and X is chlorine, bromine or iodine; acid halides of the formula $R_3COX$ and alkyl orthohaloformates of the formula $R_3OOCX$, in which $R_3$ is alkyl as hereinbefore defined and X is halogen as defined above. The reactions are preferably carried out at a temperature within the range of from about 0° C. to about 30° C. while maintaining the pH of the reaction mixture at about 9–12. The compounds of Formula IId thus obtained are recovered and purified by conventional methods.

Alternatively, the compounds of Formula IId, wherein Z is —$COOR_3$, in which $R_3$ is lower-alkyl, are prepared by the more direct route of treating the acid azide III with an alkanol of the formula $R_3OH$, in which $R_3$ is lower-alkyl, with or without a cosolvent such as ether, methylene chloride, benzene and the like. The reaction is preferably carried out at a temperature within the range of about 50° C. to about 100° C. for a period of about 1 to 5 hours, depending on the temperature employed. Reflux temperature is often convenient and advantageous. When the reaction is complete, the excess alkanol is removed and the residual product (IId) is purified by chromatography and/or crystallization.

REACTION SEQUENCE B

Alternatively, the compounds of Formula IId are prepared by treating a compound of Formula V with an anhydrous base, for example, a tertiary amine such as triethylamine and the like, or an alkanolic alkali metal alkoxide such as methanolic sodium methoxide or ethanolic potassium ethoxide, and the like. The reaction can be carried out within a wide temperature range such as from about 20° C. to the boiling point of the reaction mixture, it is often convenient and advantageous to carry out the ring-cleavage at reflux temperature. The product (IId) thus obtained is recovered by conventional methods, for example, by chromatography and/or crystallization from an organic solvent, such as ethyl acetate, acetone, hexane, and the like.

The starting compounds V for reaction sequence B are prepared from 11-ketotestoloacetone in accordance with the following reaction scheme and preparations 3 and 4, herein:

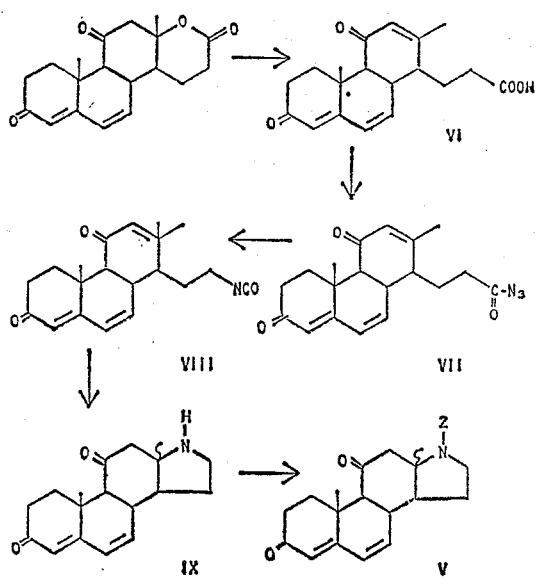

wherein Z has the meaning given herein above.

The 11-ketotestololactone (I) is treated with a slight excess of an alkanolic alkali metal alkoxide, such as methanolic sodium methoxide, ethanolic potassium ethoxide and the like, followed by acidification at the appropriate time with an aqueous acid such as hydrochloric, sulfuric, acetic and the like, to obtain the corresponding 3,11 - dioxo-13,17-secoandrosta-4,12-dien-17-oic acid of Formula VII, the reaction is carried out within a temperature range from about 0° C. to about 50° C., a temperature within the range of about 20° C. to about 35° C. or about room temperature, is convenient and advantageous. If desired the reaction can be carried out in the presence of a cosolvent such as methylene chloride.

The carboxylic acid (VI) thus obtained, is then converted to the acid chloride by reaction with oxalyl chloride or thionyl chloride in an inert organic solvent such as benzene, toluene, tetrahydrofuran, dioxane and the like, to obtain the corresponding acid chloride, or alternatively the acid chloride can be prepared by reacting an alkali metal salt of the carboxylic acid (VII) with oxalyl chloride. The acid chloride is then treated with sodium azide to obtain the acid azide (VII).

Alternatively, the acid azide (VII) is obtained without isolation of intermediates in accordance with the method to J. Weinstock, J. Org. Chem. 26, 3511 (1961); the selected carboxylic acid (2) is treated with an equivalent amount of a trialkyl amine such as triethylamine and an alkyl chloroformate, such as methyl chloroformate, ethyl chloroformate, isobutyl chloroformate and the like, in an aqueous organic solvent such as acetone, to give a mixture of carboxylic-carbonic anhydrides which are then reacted with sodium azide to give the acid azide.

The acid azide (VII) is then subjected to a standard Curtius rearrangement [P. A. S. Smith, Org. Reactions III, 337 (1946)] which involves heating the acid azide in a dry inert solvent such as benzene, toluene, tetrahydrofuran, dioxan and the like, to obtain the isocyanate (VIII).

The isocyanate thus obtained is then hydrolyzed under acidic conditions to obtain the corresponding amine salt which undergoes a Michael addition reaction under basic conditions to effect ring closure at the 17-position. Hydrolysis of the isocyanate is carried out under aqueous conditions using an aqueous strong organic acid such as trifluoroacetic acid, acetic acid, and the like or with a dilute mineral acid such as hydrochloric, sulfuric, phosphoric and the like. When acetic acid is used, the presence of a small amount of a mineral acid is desirable in order to suppress formation of the acetamide derivative. The hydrolysis can be carried out within a wide temperature rance such as from 0° C. to about 80° C., however, a temperature within the range of from about 40° C. to about 70° C. is advantageous. The amine salt thus obtained is then subjected to ring closure in the presence of a base. Ring closure is effected under a wide range of conditions and with a wide variety of bases. Illustrative of bases which can be used are alkali metal alkoxides such as potassium tert.-butoxide, sodium methoxide, lithium ethoxide, and the like; sodium or potassium hydroxide in alcohols or aqueous alcohols; quaternary ammonium hydroxide; alkali earth hydroxides such as barium or calcium hydroxide, and the like. The reaction is advantageously conducted in an organic solvent such as alcohol, e.g., methanol, ethanol, propanol, isopropanol, butanol, tert.-butanol and the like; tetrahydrofuran, dioxane or other suitable solvent. The ring closure can be carried out within a broad temperature range such as from about —10° C. to the boiling point of the reaction mixture. Temperatures within the range of from about 0° C. to about 30° C. are advantageous. The compound of Formula IX thus obtained, can be recovered from the reaction mixture and purified in accordance with conventional methods such as chromatography and/or crystallization from a suitable solvent.

The compounds of Formula IX are converted to the corresponding compounds of Formula V by reacting the selected compound IX in an inert organic solvent such as methylene chloride, tetrahydrofuran, benzene, toluene, chloroform and the like, with an excess of an acid halide or anhydride in the presence of an aqueous base such as ammonium hydroxide, sodium hydroxide, pyridine and the like. Acid halides and anhydrides which can be employed are, for example, aryl and alkyl sulfonyl halides of the formula $R_4SO_2X$, wherein $R_4$ is alkyl or aryl as hereinbefore defined and X is chlorine, bromine or iodine; acid halides of the formula $R_3COX$ and alkyl orthohaloformates of the formula $R_3OOCX$, in which $R_3$ is alkyl as hereinbefore defined and X is halogen as defined above. The reactions are preferably carried out at a temperature within the range of from about 0° C. to about 30° C. while maintaining the pH of the reaction mixture at about 9-12. The compounds of Formula X thus obtained, are recovered and purified by conventional methods.

The following preparations and examples illustrate the best mode contemplated by the inventor for carrying out his invention, but are not to be construed as limiting the scope thereof.

PREPARATION 1

6-dehydro-11α-hydroxytestololactone

A mixture of 75 g. of 11α-hydroxytestololactone, 75 g. of recrystallized (dioxane) chloranil and 900 ml. of t-butyl alcohol is stirred under reflux for 50 minutes before being concentrated in vacuo. A chloroform solution of the residue thus obtained is washed with dilute potassium hydroxide solution, water and then dried and concentrated in vacuo. Trituration of the residue with acetone give 29.15 g. of 6-dehydro-11α-hydroxytestololactone, M.P. 233–235° C. and 4.6 g. with M.P. 228–230° C. An analytical sample is recrystallized from acetone to give 6-dehydro - 11α - hydroxytestololactone, M.P. 233–236.5° C.;

$$\lambda_{max.}^{EtOH} \ 283 \ m\mu$$

(ε 26,700); IR and NMR spectra are in agreement with the structure.

*Analysis.*—Calcd. for $C_{19}H_{24}O_4$ (percent): C, 72.12; H, 7.65. Found (percent): C, 72.19; H, 7.99.

PREPARATION 2

*6-dehydro-11-ketotestololactone (I)*

To a mixture of 32 g. of 6-dehydro-11α-hydroxytestololactone, 320 ml. of methylene chloride and 320 ml. of acetone is added with stirring 26 ml. of Jones reagent. After 20 minutes an additional 20 ml. of Jones reagent is added and the reaction mixture is stirred for about 15 minutes. The mixture is then shaken with 1 l. of chloroform and water. The organic layer is separated, washed with dilute hydrochloric acid, water, dilute potassium hydroxide solution, and then dried and concentrated in vacuo. Trituration of the residue thus obtained with acetone gives 17.5 g. of 6-dehydro-11-ketotestololactone (I), M.P. 267–268° C. and 7.45 g. recrystallized from tetrahydrofuran with M.P. 263–264° C. An analytical sample crystallized from methylene chloride-tetrahydrofuran give 6-dehydro-11-ketotestololactone, M.P. 264–265° C.;

$$\lambda_{max.}^{EtOH} \ 279 \ m\mu$$

(ε 25,000) and IR and NMR spectra in agreement with the assigned structure.

*Analysis.*—Calcd. for $C_{19}H_{22}O_4$ (percent): C, 72.59; H, 7.05. Found (percent): C, 72.48; H, 7.14.

PREPARATION 3

*17 - (methylsulfonyl) - 17 - aza - 13α-androsta-4,6-diene-3,11 - dione and 17-(methylsulfonyl)-17-azaandrosta-4,6-diene-3,11-dione (V)*

To a mixture of 14 g. of 6-dehydro-11-ketotestololactone and 500 ml. of methanol under a nitrogen atmosphere is added 10 ml. of 25% methanolic sodium methoxide. The mixture is stirred at room temperature for 16 hours when the pH of the solution is adjusted to 7 with a few drops of concentrated hydrochloric acid. The solution is then concentrated in vacuo and the residue obtained is dissolved in water. The aqueous solution is acidified to pH 1 and extracted with chloroform. The organic extract is washed with water, dried and concentrated in vacuo to give 14 g. of the 3,11-dioxo-13,17-secoandrostan-4,6,12-triene-17-oic acid (VI) as an oil.

To a mixture of 14 g. (0.0446 mole) of the 3,11-dioxo-13,17-secoandrosta-4,6,12-triene-17-oic acid thus obtained, 250 ml. of acetone, 200 ml. of water and 4.8 g. (0.048 mole) of triethylamine at 0–5° C. is added with stirring 6.56 g. (0.048 mole) of isobutyl chloroformate. The mixture is stirred at about 0° C. for 30 minutes when a cold solution of 14 g. of sodium azide in 70 ml. of water is added. One hour later the mixture is diluted with water and extracted with methylene chloride. The organic layer is washed with cold water, dilute potassium bicarbonate solution, water, saturated sodium chloride solution and is then dried and concentrated in vacuo below 30° to give 3,11-dioxo-13,17-secoandrosta-4,6,12-triene-17-oic acid azide (VII).

A solution of the acid azide thus obtained in 800 ml. of benzene is concentrated in vacuo to about 500 ml. (to remove traces of water) and the mixture is then refluxed for 1.5 hours and then concentrated in vacuo to give, 3,11 - dioxo - 13,17 - secoandrosta-4,6,12-trien-16-isocyanate, $$\nu_{max.}^{CH_2Cl_2} \ 2280 \ cm.^{-1} \ (VIII)$$

A mixture of the isocyanate thus obtained (ca. 14 g.), 150 ml. of glacial acetic acid, 50 ml. of water and 1 drop of triethylamine is heated at 60° under a nitrogen atmosphere for 2 hours. The mixture is concentrated in vacuo and the residue is shaken with methylene chloride and dilute potassium hydroxide solution. The organic layer is washed with water, dried and concentrated in vacuo. The residue thus obtained is dissolved in methanol under nitrogen, allowed to stand for about 16 hours at room temperature, about 25° C., and then concentrated in vacuo to give 3,11-dioxo-17-azo-13ξ-androst-4,6-diene (IX).

To a mixture of 11 g. of 3,11-dioxo-17-aza-13ξ-androst-4,6-diene, thus obtained 150 ml. of methylene chloride, 50 ml. of water and 100 ml. of concentrated ammonium hydroxide at 0–5° is added dropwise with stirring 30 ml. of methanesulfonyl chloride at such a rate as to maintain a reaction temperature below 15°. Ten minutes after the addition, more methylene chloride is aded and the organic layer is washed with dilute potassium hydroxide solution, water and then dried and concentrated in vacuo to give 12 g. of a residue containing sulfonamides. The crude product is chromatographed on a column prepared by wet packing 2 kg. of silica gel with 4 l. of 10% methanol in chloroform. Elution of the column with 3–6% methanol in chloroform gives three principal bands of material. The material from the first band is crystallized from ethyl acetate to give 3.6 g. of 17-(methylsulfonyl)-17-aza-13α-androsta-4,6-diene-3,11-dione, M.P. 176–177° C., and 1.9 g. of second crop of the same product, M.P. 175–176° C. An analytical sample of 17-(methylsulfonyl)-17-aza-13α-androstat-4,6-diene-3,11-dione had M.P. 176–177°, $$\lambda_{max.}^{EtOH} \ 280 \ m\mu$$

(ε 26,050) and IR, NMR and mass spectra in agreement with the structure.

*Analysis.*—Calcd. for $C_{19}H_{25}NO_4S$ (percent): C, 62.78; H, 6.93; S, 8.82. Found (percent): C, 62.53; H, 6.46; S, 8.69.

The material from the second band was triturated with ethyl acetate to give 0.41 g. (2.5%) of 17-(methylsulfonyl)-17-azaandrosta-4,6-diene-3,11-dione, M.P. 209–211° C. An analytical sample of 17-(methylsulfonyl)-17-azaandrosta-4,6-diene - 3,11 - dione is crystallized from methylene chloride-ethyl acetate, M.P. 210–211.5° C.;

$$\lambda_{max.}^{EtOH} \ 281 \ m\mu$$

(ε 26,250) and IR, NMR and mass spectra in agreement with the structure.

*Analysis.*—Calcd. for $C_{19}H_{25}NO_4S$ (percent): C, 62.78; H, 6.9. Found (percent): C, 62.79; H, 7.07.

PREPARATION 4

*Methyl 3,11-dioxo-17-aza-13α-androsta-4,6-diene 17-carbamate (V)*

To a solution of 28 g. of 6-dehydro-11-ketotestololactone, 20 ml. of ethylene chloride and 400 ml. of methanol under nitrogen is added with stirring 20 ml. of 25% methanolic sodium methoxide. The mixture is stirred at room temperature for 1 hour adjusted to pH 71 and the product recovered in the manner described in Preparation 3, above, to give 28 g. of 3,11-dioxo-13,17-secoandrosta-4,6,12-trien-17-oic acid, which is converted to 3,11 - dioxo - 13,17 - secoandrosta - 4,6,12 - triene - 16-isocyanate in accordance with the procedure of Preparation 3, above. The isocyanate thus obtained is dissolved in 300 ml. of acetic acid, 90 ml. of water and 8 ml. of concentrated hydrochloric acid. The mixture is allowed to stand at room temperature for 16 hours and at 60° for 1 hour before being concentrated in vacuo. The residue is stirred with ether-methylene chloride (2:1) and dilute potassium hydroxide solution under nitrogen for 2 hours. The organic layer is washed with water then concentrated in vacuo to give 3,11-dioxo-17-aza-13ξ-androst-4,6-diene (IX).

To a stirred mixture of the 3,11 - dioxo - 17 - aza-13ξ - androst - 4,6 - diene thus obtained, 300 ml. of methylene chloride and 150 ml. of water is added alternatively small portions of 35 ml. of methyl chloroformate and dilute potassium hydroxide solution so as to maintain the pH of the aqueous layer at 9–12. Five minutes after the last chloroformate addition, the organic layer is separated and washed with cold dilute ammonium hydroxide solution, water and then dried and concentrated in vacuo. The residue (28 g.) thus obtained is chromatographed on a column prepared by wet packing 3 kg. of silica gel with about 6 l. of 10% methanol in chloroform. Elution with 3% methanol in chloroform gives one main band of material which is recrystallized from ethyl acetate-hexanes to give 11.45 g. of methyl 3,11 - dioxo - 17 - aza - 13α-androsta - 4,6 - diene 17-carbamate, M.P. 145–149° and 8.15 g. with M.P. 151–154°. An analytical sample of the methyl 3,11 - dioxo - 17 - aza - 13α - androsta-4,6-diene 17-carbamate is crystallized from acetonitrile as a 1:1 mole solvate and has a vac. M.P. of 138°, resolidifying and remelting at 178–179°, $$\lambda_{max.}^{EtOH}\ 279\ m\mu$$

279 mμ (ε 23,650); IR, NMR and mass spectra are in agreement with the structure.

*Analysis.*—Calcd. for $C_{20}H_{25}NO_4$ (percent): C, 69.95; H, 7.33. Found (percent): C, 70.07; H, 7.39.

The corresponding 13β-isomer, 3,11 - dioxo - 17 - aza-androsta - 4,6 - diene - 17 - carboxylic acid, methyl ester is recovered from the mother liquor by additional chromatography.

EXAMPLE 1

*4b,5,6,7,9,10-hexahydro-4-hydroxy-2,4b-dimethyl-7-oxo-1-phenanthrenepropionic acid (IIa)*

To a solution of 37.5 g. of 6-dehydro-11-ketotestololactone in 750 ml. of anhydrous methanol under a nitrogen atmosphere is added with stirring 65 ml. of 25% methanolic sodium methoxide. The mixture is stirred overnight at room temperature, partially neutralized (pH 9) with dilute hydrochlric acid and then concentrated in vacuo to remove most of the methanol. The residue thus obtained is diluted with water and the resulting solution washed with ether. The aqueous layer is acidified and extracted with ether-methylene chloride (3:1). The organic layer is washed with saturated salt solution, then dried and concentrated in vacuo to give 38.8 g. of 4b,5,6,7,9,10 - hexahydro - 4 - hydroxy - 2,4b - dimethyl-7-oxo-1 - phenanthrenepropionic acid, M.P. 100–115° C. IR, NMR and UV spectra are in agreement with the structure.

EXAMPLE 2

*4b,5,6,7,9,10-hexahydro-4-hydroxy-2,4b-dimethyl-7-oxo-1-phenanthrenepropionic acid, methyl ester (IIb)*

To a solution of 9.6 g. of crude 4b,5,6,7,9,10 - hexahydro - 4 - hydroxy - 2,4b - dimethyl - 7 - oxo - 1 - phenanthrenepropionic acid, 50 ml. of methylene chloride and 150 ml. of ether is added with stirring a slight excess of ethereal diazomethane. After 3–4 minutes the excess diazomethane is destroyed with acetic acid and the solution is washed with dilute sodium bicarbonate solution and saturated salt solution. The dried organic layer is concentrated in vacuo and the residue is chromatographed on a column prepared by wet-packing 2 kg. of silica gel with about 4 l. of 7% methanol in chlorofom. Elution of the column with 2% methanol in chloroform gives material which is crystallized from ether giving 3.77 g. of 4b,5,6,7,9,10 - hexahydro - 4 - hydroxy - 2,4b - dimethyl-7 - oxo - 1 - phenanthrenepropionic acid, methyl ester, M.P. 130.5–132° C.; IR, NMR, UV and mass spectra of the product are in agreement with the structure.

*Analysis.*—Calcd. for $C_{20}H_{24}O_4$ (percent): C, 73.14; H, 7.37. Found (percent): C, 73.26; H, 7.63.

EXAMPLE 3

*4,5,6,7,9,10-hexahydro-4-hydroxy-N,N,2,4b-tetramethyl-7-oxo-1-phenanthrene-propionamide (IIc)*

To a stirred solution of 3.2 g. of crude 4b,5,6,7,9,10-hexahydro - 4 - hydroxy - 2,4b - dimethyl - 7 - oxo-1-phenanthrenepropionic acid, 50 ml. of acetone, 4 ml. of water and 1.03 g. of triethylamine at 0° is added 1.41 g. of isobutyl chloroformate. The solution is stirred at 0° for 30 minutes, at which time 10 ml. of dimethylamine is added. The mixture is stirred at 0° for 30 minutes and was then shaken with chloroform and dilute hydrochloric acid. The organic layer is washed with dilute sodium bicarbonate solution, saturated salt solution, dried and concentrated in vacuo. The residue thus obtained is chromatographed on a column prepared by wet packing 1 kg. of silica gel (Brinkmann) with 2 l. of 8% methanol in chloroform. Elution with 2–5% methanol in chloroform gives material which is recrystallized from acetonitrile to give 2.19 g. of 4b,5,6,7,9,10 - hexahydro - 4 - hydroxy-N,N,2,4b - tetramethyl - 7 - oxo - 1 - phenanthrene-propionamide as an acetonitrile solvate, even after drying under reduced pressure, M.P. 106–108°; the IR, NMR, UV and mass spectra are in agreement with the structure.

*Analysis.*—Calcd. for $C_{21}H_{27}NO_3 \cdot CH_3CN$ (percent): C, 72.22; H, 7.91. Found (percent): C, 72.24; H, 7.91.

Drying the sample above the melting point gives 4b,5,6,7,9,10 - hexahydro - 4 - hydroxy - N,N,2,4b - tetramethyl - 7 - oxo - 1 - phenanthrene-propionamide in the solvent free form.

EXAMPLE 4

*4-[2-(4b,5,6,7,9,10-hexahydro-4-hydroxy-2,4b-dimethyl-7-oxo-1-phenanthryl)-ethyl]methanesulfonamide (IId)*

To a cold (0–5°) solution of 15.7 g. of 4b,5,6,7,9,10-hexahydro - 4 - hydroxy - 2,4b - dimethyl - 7 - oxo-1-phenanthrenepropionic acid, 250 ml. of acetone, 20 ml. of water and 5.35 g. of triethylamine is added with stirring 7.24 g. of isobutyl chloroformate. A cold solution of 15 g. of sodium azide in 70 ml. of water is added after 30 minutes, and 1 hour later the mixture is shaken with cold water and methylene chloride. The organic layer is washed with water, dilute potassium bicarbonate solution, saturated salt solution and is then dried and concentrated in vacuo at a bath temperature below 30° C.

To the residual acid azide (III) thus obtained is added 150 ml. of acetic acid and 20 ml. of water. The mixture is heated and stirred on a steam bath for 2 hours, then cooled and acidified with 42 ml. of concentrated hydrochloric acid. The mixture is concentrated in vacuo to give the crude amine hydrochloride (IV). One-half of this material is converted to the methanesulfonamide by dissolving it in 50 ml. of water and 100 ml. of methylene chloride and adding to this mixture alternately dilute potassium carbonate solution (to maintain a slightly alkaline solution) and excess methanesulfonyl chloride with stirring. The mixture is extracted with chloroform and the organic phase is washed with water, dilute hydrochloric acid, water and is then dried and concentrated. The residue thus obtained is chromatographed on a column prepared by wet packing 2 kg. of silica gel with 4 l. of 7% methanol in 1:1 methylene chloride-chloroform. Elution of the column with 3% methanol in 1:1 methylene chloride-chloroform gives a band of material corresponding to product. Trituration of this material with hot ethyl acetate gives 0.52 g. of N-[2-(4b,5,6,7,9,10-hexahydro-4-hydroxy-2,4b-dimethyl-7-oxo-1-phenanthryl)-ethyl]-methanesulfonamide, M.P. 218–220° C.; infrared spectrum and $R_f$ behavior are identical with those of the sample of N-[2-(4b,5,6,7,9,10 - hexahydro - 4-hydroxy-2,4b-dimethyl-7-oxo-1-phenanthryl)-ethyl]methanesulfonamide prepared in Example 6, below.

EXAMPLE 5

*Methyl N-[2-(4b,5,6,7,9,10-hexahydro-4-hydroxy-2,4b-dimethyl-7-oxo-1-phenanthryl)-ethyl]carbamate*

To the residual acid azide (III) prepared in the same manner as describd in the first paragraph of Example 4, above, is added 250 ml. of methyl alcohol. The mixture thus obtained is heated at 70–100° C. for about 3 hours. The excess alcohol is removed by distillation in vacuo and the residue thus obtained is chromatographed on silica gel to give methyl N-[2-(4b,5,6,7,9,10-hexahydro-4-hydroxy-2,4b - dimethyl - 7 - oxo-1-phenanthryl)-ethyl]carbamate (IId).

EXAMPLE 6

*N-[2-(4b,5,6,7,9,10-hexahydro-4-hydroxy-2,4b-dimethyl-7-oxo-1-phenanthryl)-ethyl]methanesulfoamide (IId)*

A mixture of 2.3 g. of 17-methylsulfonyl)-17-aza-13α-androsta-4,6-diene-3,11-dione (V), 75 ml. of absolute ethanol and 15 ml. of triethylamine is heated under reflux for 4 hours, then concentrated in vacuo. The residue is chromatographed on a column prepared by wet packing 500 g. of silica gel with 1 l. of 10% methanol in chloroform. Elution of the column with 2–4% ethanol in chloroform gives two principal bands. The latter fractions of band II on trituration with ethyl acetate give 0.22 g. of N-[2-(4b,5,6,7,9,10 - hexahydro - 4-hydroxy-2,4b-dimethyl-7-oxo-1-phenanthryl)-ethyl]methanesulfonamide, M.P. 222–223° C.;

$\lambda_{max.}^{EtOH}$ 234 m$\mu$ 234 m$\mu$ ($\epsilon$ 24,400) and 286 m$\mu$ ($\epsilon$ 3050) NMR, IR and mass spectra are in agreement with the structure.

*Anal.*—Calcd. for $C_{19}H_{25}NO_4S$ (percent): C, 62.79; H, 6.93; N, 3.85; S, 8.81. Found (percent): C, 62.93; H, 6.94; N, 3.75; S, 9.04.

EXAMPLE 7

*Methyl N-[2-(4b,5,6,7,9,10-hexahydro-4-hydroxy-2,4b-dimethyl-7-oxo-1-phenanthryl)-ethyl]carbamate (IId)*

A mixture of 2.0 g. of methyl 3,11-dioxo-17-aza-13α-androsta-4,6-diene 17-carbamate, 75 ml. of absolute ethanol and 15 ml. of triethylamine is heated under reflux for about 4 hours, and then concentrated in vacuo. The residue thus obtained is chromatographed on silica gel to give methyl N-[2-(4b,5,6,7,9,10-hexahydro-4-hydroxy-2,4b-dimethyl-7-oxo-1-phenanthryl)-ethyl]carbamate.

I claim:
1. A compound of the formula

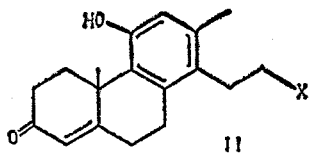

wherein X is —COOR, in which R is hydrogen or a lower-alkyl radical of from 1 to 6 carbon atoms, inclusive and the pharmacologically acceptable salts of the compound in which R is hydrogen.

2. 4b,5,6,7,9,10-hexahydro-4-hydroxy-2,4b-dimethyl-7-oxo-1-phenanthrenepropionic acid, the compound of claim 1 wherein X is —COOR, in which R is hydrogen.

3. 4b,5,6,7,9,10-hexahydro-4-hydroxy-2,4b-dimethyl-7-oxo-1-phenanthrenepropionic acid, methyl ester, the compound of claim 1, wherein X is —COOR, in which R is methyl.

4. The process for the preparation of 4b,5,6,7,9,10-hexahydro - 4 - hydroxy - 2,4b-dimethyl-7-oxo-1-phenanthrenepropionic acid, which comprises subjecting 6-dehydro-11-ketotestololactone to ring cleavage and aromatization in the presence of a base selected from the group consisting of an alkali metal alkoxide and an alkali metal hydroxide.

5. The process of claim 4, wherein the ring cleavage is carried out using an alkanolic alkali metal alkoxide.

6. The process of claim 5, wherein the alkanolic alkali metal alkoxide is methanolic sodium methoxide.

References Cited

UNITED STATES PATENTS 3,174,982   3/1965   Diassi _____ 260—343.2

OTHER REFERENCES

Fieser et al. Reagents For Organic Chemistry, p. 569 (1968).

LORRAINE A. WEINBERG, Primary Examiner

R. GERSTL, Assistant Examiner

U.S. Cl. X.R.

260—211, 239 A, 239 B, 247.2 R, 268 R, 294 A, 294 S, 294.7 C, 326.12 R, 326.13 R, 326.3, 326.5 C, 343.2 R, 349, 429.9 439 R, 448 R, 453 AL, 501.1, 501.17, 514.5, 556 A, 556 Ar, 559 R, 562 A, 570.8 TC; 424—300, 308, 316, 317, 321, 324

UNITED STATES PATENT OFFICE
CERTIFICATE OF CORRECTION

Patent No. 3,658,880                    Dated April 25, 1972

Inventor(s) Norman A. Nelson

It is certified that error appears in the above-identified patent and that said Letters Patent are hereby corrected as shown below:

Column 3, lines 50-51, should read -- basic conditions followed by acidification with an aqueous acid such as hydrochloric, sulfuric, acetic and the like, --.

Signed and sealed this 25th day of July 1972.

(SEAL)
Attest:

EDWARD M. FLETCHER, JR.          ROBERT GOTTSCHALK
Attesting Officer                Commissioner of Patents